${}^{\text{United States Patent Office}}$

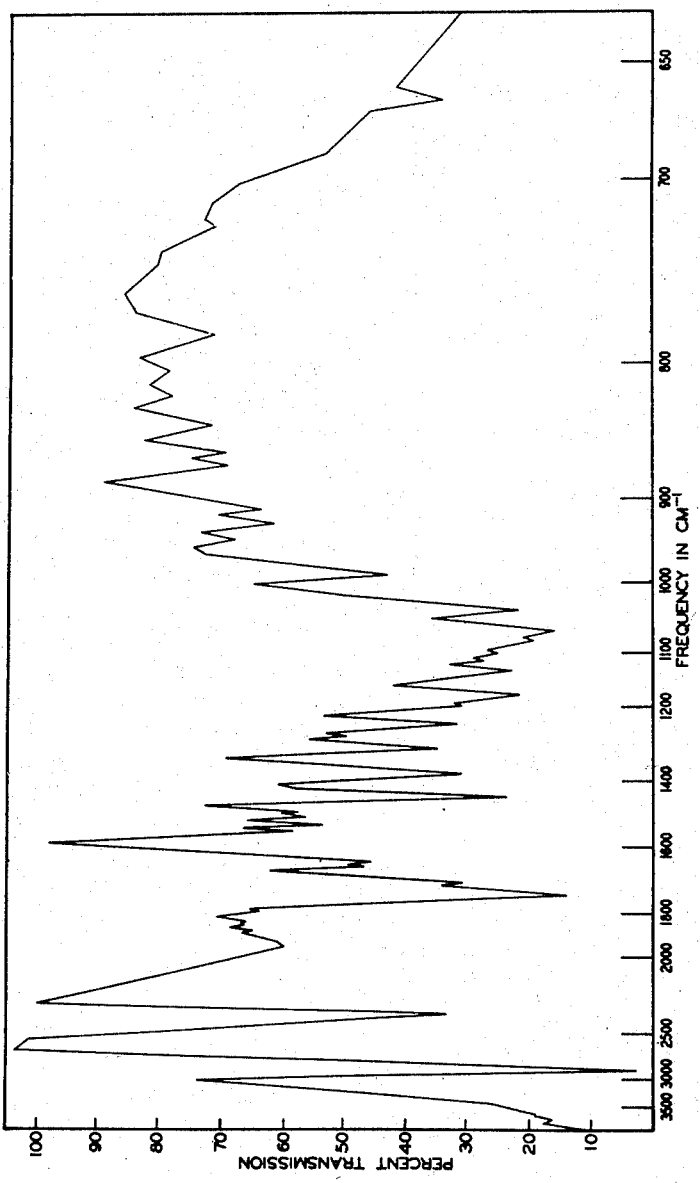

2,902,412
FERMENTATIVE CARBOMYCIN PRODUCTION

Joseph F. Pagano, Bound Brook, Richard Donovick, Westfield, James D. Dutcher, New Brunswick, and Leon J. Heuser, Princeton, N.J., assignors to Olin Mathieson Chemical Corporation, New York, N.Y., a corporation of Virginia Continuation of application Serial No. 299,368, July 17, 1952. This application June 4, 1956, Serial No. 589,324

6 Claims. (Cl. 195—80)

This application is a continuation of our application Serial No. 299,368, filed July 17, 1952, now abandoned.

This invention relates to a new antibiotic and to its production. More particularly, it relates to a new antibiotic in various forms, and to processes for producing it by fermentation, as well as concentrating and/or purifying it, isolating it, and producing salts thereof. The invention embraces the antibiotic and its salts in solution form, as concentrates, and in pure crystalline form.

The antibiotic of this invention is formed by the cultivation, under controlled conditions, of a hitherto undescribed species of Streptomyces isolated from a soil sample obtained in North Charleston, North Carolina, and referred to hereinafter as *Streptomyces thermotolerans*. A culture of the living organism has been deposited and made part of the Stock Culture Collection of the New Jersey Agricultural Experiment Station, New Brunswick, New Jersey, where it has been assigned the number, 3628. A culture of the living organism has also been deposited and made part of the American Type Culture Collection, Washington, D.C., where it has been designated as ATCC 11,416. Cultures are available from either source.

For isolating and characterizing the microorganism, a portion of the soil sample (1 g. approx.) is diluted in sterile water, plated on an agar containing in distilled water: sucrose, 1%; citric acid, .12%; $(NH_4)_2HPO_4$, .04%; KCl, .008%; $MgCl_2.6H_2O$, .0418%; $MnCl_2.6H_2O$, .0036%; $FeCl_3.6H_2O$, .0023%; $ZnCl_2$, .0021%; $CoCl_2.6H_2O$, .0004%; galactose, 1.0%; and agar, 1.5%; which is then incubated at 26° C. for 10 days. A colony of the newly-isolated Streptomycete, selected from the organisms on the plates, when streak-tested against bacteria, has been found to show activity against *Micrococcus pyogenes* var. *aureus*, *Aerobacillus polymyxa*, and *Streptococcus faecalis*.

In the following description of colonies of the organism after 6 days' incubation at 26° C. in various agar media, the designated colors are based on Ridgway, "Color Standards and Color Nomenclature," Washington, D.C., 1912:

(In yeast-beef agar, consisting of: yeast extract, 0.3%; beef extract 0.15%; peptone, 0.6%; dextrose, 0.1%; agar, 1.5% and distilled water.) Growth is good. Aerial mycelium and spores are cartridge buff to pale smoke grey. The colonies are convex and opaque with edge lacerate. Sporulation is heavy; aerial mycelium slight with short irregular protuberances. Reverse color is tawny buff. Agar diffusible pigment produced which is pinkish buff. The vegetative mycelium is 0.5–0.7 microns in diameter. The spores are 0.5 x 1.0–1.5 microns in diameter.

(In Czapek-Dox agar, consisting of $NaNO_3$, 0.3%; $KH_2PO_4$, 0.1%; KCl, 0.05%; $MgSO_4.7H_2O$, 0.05%; $FeSO_4.7H_2O$, 0.001%; glucose, 4.0%; agar, 1.5%; and distilled water.) Colonies are circular, finely granular, low convex with lacerate edge. Spores are pale pinkish buff and reverse colony is primuline yellow No exopigment is produced.

(In Sabouraud's agar, consisting of: neopeptone, 1.0%; dextrose, 4.0%; agar, 1.5%; and distilled water.) Colonies are circular, finely granular, low convex with lacerate edge. Spores are Rood's brown to pale pinkish buff and reverse colony is warm sepia. Agar diffusible pigment produced which is clay color.

(In soybean infusion agar, consisting of: soy infusion (boiled 30 minutes, filtered) 2%; dextrose, 0.2%; sodium chloride, 0.5%; agar, 2.0%; and distilled water (adjusted to pH 7 before sterilization).) Colonies are circular, finely granular, opaque, convex with lacerate edge, spores are white to pale smoke grey. The reverse colony is buckthorn brown in the center with outer edges warm buff. No exopigment is produced.

(In Henrici agar, consisting of: casein hydrolysate, 0.5%; glycerine, 0.5%; $K_2HPO_4$, 0.2%; $MgSO_4.7H_2O$, 0.2%; $FeSo_4.7H_2O$, 0.2%; agar, 1.5%; and distilled water.) Colonies are white with a raised crown which is pallid mouse grey. The reverse colony is clove brown with a circular edge which is blackish brown No. 3. Exopigment is buffy brown.

The above description of the organism used to obtain the antibiotic of this invention is merely illustrative, and it is to be understood that this invention is not limited to the use of that organism or to organisms fully answering that description, but includes, inter alia, mutants produced from the described organism by mutating agents, such as X-radiation, ultra-violet radiation and nitrogen mustards.

The microorganism is capable of assimilating the following carbon sources in a basal medium containing $(NH_4)_2SO_4$ as a source of nitrogen; rhamnose, xylose, glucose, galactose, fructose, mannose, lactose, maltose, sucrose, raffinose, glycerol, mannitol, dextrin, inulin, starch, inositol and ammonium tartrate. The following carbon compounds support growth poorly; arabinose, sorbitol, sodium citrate. Growth is not supported by any of the following carbon compounds: dulcitol, salicin, sodium acetate, ammonium formate, ammonium oxalate.

In a basal medium containing starch as a source of carbon, the following nitrogen sources will support growth: ammonium sulfate, sodium nitrite, and asparagine; tyrosine supports growth poorly: and acetamide will not support growth.

The microorganism is also identified by its ability to grow at 26° C. and 37° C. on yeast-beef, soybean meal, and Sabouraud's agar. It does not produce indole and does not reduce nitrate, but will liquefy gelatin with formation of brown pigment, and cause litmus milk to become acid.

The antibiotic of this invention has been found to possess a wide antibiotic spectrum, in vitro tests against a variety of organisms and in general to be effective in inhibiting the growth of gram positive bacteria and mycobacteria. Thus, among the organisms failing to propagate in the presence of the antibiotic are *Micrococcus pyogenes* var. *aureus*, *Streptococcus pyogenes*, *Streptococcus faecalis*, *Diplococcus pneumoniae* type 2, *Diplococcus pneumoniae* type 3, *Bacillus subtilis*, *Clostridium septicum*, *Klebsiella pneumoniae*, *Escherichia coli*, *Aerobacter aerogenes*, *Salmonella typhosa*, *Salmonella schottmulleri*, *Shigella dysenteriae*, *Shigella sonnei*, *Proteus vulgaris*, *Pseudomonas aeruginosa*, and *Mycobacterium tuberculosis* var. *bovis* BCG. When in pure crystalline form, the antibiotic of this invention possesses a high order of activity, comparable to that of chloramphenicol when tested against meningopneumonitis virus and about 4 times that of chloramphenicol when tested against *Rickettsia rickettsi*. Furthermore, due to its solubility in oil, the antibiotic of this invention is especially adapted for use in various delayed-action oil-base formulations.

The data following shows the potency of antibiotic-containing broths obtained in the practice of this invention, measured in dilution units (which, as used herein, is the reciprocal of the highest dilution of the broth which completely inhibits the growth of a test organism, that organism being *Micrococcus pyogenes* var. *aureus* 209P unless otherwise specified). In these tests, fermentation was allowed to proceed for the specified periods in a soybean-meal nutrient medium (adjusted to pH 7 after sterilization) consisting of: soybean meal, 3%; dextrose, 2%; $CoCl_2.6H_2O$, 0.0005%; and $CaCO_3$, 0.1%, in distilled water: and the dilution units were determined against the selected test organisms.

DILUTION UNITS

|  | *Micrococcus pyogenes* var. *aureus* 209 P | | *Klebsiella pneumoniae* | | B.C.G. | |
| --- | --- | --- | --- | --- | --- | --- |
|  | 4 day | 7 day | 4 day | 7 day | 4 day | 7 day |
| Neutral pasteurized sample | 315 | 342 | <25 | 62 | <25 | 25 |
| Acid pasteurized sample | 125 | 342 | <25 | 44 | 25 | 25 | pH of fermentation at 4 days: 7.9. pH of fermentation at 7 days: 7.7.

The antibiotic of this invention is preferably produced by submerged aerated culture of the organism to yield broths (in large scale fermentation) having potencies up to about 2000 or more d.u./m., but may also be produced by surface culture, with aeration provided by merely exposing the surface to a sterile air supply. In either case, sources of carbon for energy and nitrogen for growth are included in the nutrient medium.

As the energy-source material one may use: a carbohydrate, such as starch, soluble starch, dextrose, sucrose, and maltose: a sugar alcohol (e.g. glycerol); or a lipid, such as (1) fat acid, (2) a fat or (3) a mixture of such materials. Illustrative fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin; and illustrative fat acids are acetic, propionic, butyric, stearic, palmitic, oleic, lauric, linoleic, and myristic acids. Preferred as the energy-source materials are the carbohydrates, especially dextrose.

The sources of nitrogenous, growth-promoting factors are those normally employed in such processes. They may be natural organics (e.g. soybean meal, corn steep liquor, meat extract, casein, fish meal, liver cake, and/or distillers' solubles) or synthetics such as inorganic nitrates or ammonium compounds. Corn steep liquor because of the wide variety of substances contained therein, is a valuable addition to the fermentation medium.

The media used in the process of the invention may contain precursors in addition to the nutrient components, to obtain other valuable products. For example, an assimilable source of cobalt may be included where cobalamines (vitamin $B_{12}$ and vitamin $B_{12}$-like products) are desired, and these by-products then recovered by conventional methods. Or steroid precursors, such as progesterone or Reichstein's Compound S or S acetate, may be added to obtain a steroid oxidized in the 11 position.

As in most fermentation processes, the process of the present invention is desirably carried out using a liquid medium containing mineral components enhancing growth of the organism, for example, sources of potassium calcium, magnesium, sulfur, iron, other trace elements, and phosphate. These components are desirably added to the medium unless already present therein as a component (e.g. impurity) of the crude carbon- or nitrogen-source material (e.g. corn steep liquor).

In large scale fermentation by submerged aerated culture, the pH of the medium is preferably adjusted if necessary to about 7 (although a pH about 5 to 9 may be used) by addition of buffering agents, the pH tending to become slightly alkaline (pH about 7.5–8.5) as fermentation proceeds. Fermentation temperatures from about 20 C. to about 40° C. may be used, with a temperature of about 25° C. preferred. The stirring may be effected by mechanical agitation at 100 or more r.p.m. with aeration at a superficial velocity up to about 3 or more meters per minute.

Small scale fermentation, for laboratory investigation or for the production of inoculae for larger fermentations, may be conducted in shaker flasks plugged with cotton. Thus, 250 ml. of an aqueous nutrient medium containing: soybean meal, 3%; dextrose, 2%;

$CoCl_2.6H_2O$ 0.0005%; and $CaCO_3$, 0.1% is placed in a one-liter Erlenmeyer flask, sterilized in the usual manner (i.e. by autoclaving), then adjusted to pH 7.0 with 12 N NaOH. The medium is then inoculated with the growth on an agar slant (either yeast-beef or soy infusion) of *Streptomyces thermotolerans,* and incubation is allowed to proceed for 48–96 hours on a reciprocating shaker oscillating at a rate of 140 one-inch-strokes per minute. Other media may be used, such as aqueous media containing: (A) beef extract, 0.15%; yeast extract, 0.15%; peptone, 0.5%; dextrose, 0.5%; sodium chloride 0.35%; $K_2HPO_4$, 0.368%; $KH_2PO_4$, 0.132%; (B) cerelose, 1%; peptone, 1%; beef extract, 0.03%; yeast extract, 0.5%; and (C) dextrose, 4%; peptone, 1%.

The antibiotic of this invention may be obtained in crystalline form from the filtered fermentation broth by: (1) extracting with a substantially water-immiscible organic solvent, such as benzene, chloroform, amyl acetate, ethyl acetate, butanol, amyl alcohol, trichlorethylene, and ether, at pH preferably about 6.6 or higher; (2) distilling off the organic solvent under vacuum in the presence of water, yielding a water-insoluble oil fraction and a water-soluble fraction; freeze drying the water-soluble fraction; and recrystallizing it from an organic solvent or solvent mixture, such as isopropanol, a mixture of benzene and petroleum ether, aqueous methanol, ethanol or acetone. The product is colorless, and separates in the form of prisms or needles; the crystals are not hydrated and after drying at 100° C. in vacuo are not hygroscopic.

The crystalline antibiotic (free base) thus obtained is very soluble in most organic solvents, inter alia, in ethyl acetate, glacial acetic acid, amyl acetate, butanol, benzene, and acetone; to a lesser degree, it is soluble in methanol, ethanol, ethyl ether and isopropanol. The free base is nearly insoluble (or otherwise stated, only slightly soluble) in hot or cold water or petroleum ether, but dissolves readily in aqueous acid solution (e.g. 0.05 N acetic or hydrochloric acid): and it is insoluble in aqueous alkali.

The vacuum-dried crystals (free base) melt at 207–209° C. in an open capillary in an oil bath. The hot-stage melting point is 220–222° C. after softening at 215° C. The specific rotation of the free base is $[\alpha]_D^{22} = -57° \pm 3°$ (absolute ethanol, c.=0.5 to 1.0)
$[\alpha]_D^{22} = -53° \pm 3°$ (0.05 N acetic acid, c.=0.3)

Following are the analytical data obtained using the crystalline free base, dried in vacuo at 100° C.

Calculated for $C_{42}H_{73}NO_{16}$: C, 59.48; H, 8.68; N, 1.65; 2(methoxyl), 7.31. Found: C, 59.24; H, 8.64; N, 1.76; methoxy, 7.33.

The crystalline material contains no detectable amount of halogen or sulfur. In dilute aqueous acid solution (0.05 N acetic acid), it (1) gives a precipitate with phosphotungstic acid, picric acid, methyl orange, and Reinecke acid, (2) gives no precipitate with silver nitrate or mercuric chloride solution, (3) does not reduce Fehling's or Tollen's reagent, (4) reduces potassium permanganate at room temperature, (5) consumes bromine water to form a turbid solution, (6) gives no color with ferric chloride solution, and (7) on addition of an equal volume of hydrochloric acid (conc.), gives a purple color which fades to tan.

The concentrate (i.e. the water-soluble fraction obtained by ether-extraction of the broth filtrate followed by evaporation of the ether in the presence of water) may also be crystallized after purification by adsorption. Thus the concentrate in 10% acetone in benzene is adsorbed onto a silica gel column, and the column developed by elution with acetone-benzene solvent mixtures containing a gradually increasing proportion of acetone. The active material, which is in a single band, comes off the column with 30% acetone in benzene (80% of the total activity adsorbed is thus recovered). The residue remaining after allowing the solvent to evaporate from the eluate is readily crystallized from isopropanol (M.P. 207–209° C.).

Acid-addition salts of the free base (mineral acid salts, such as the hydrochloride, sulfate, phosphate; and organic acid salts such as the citrate, tartrate, gluconate, and p-tolueno sulfonate) may be prepared using standard procedures, water-soluble salts of pharmacologically-acceptable acids being preferred. Thus, the hydrochloride may be prepared by any of the following methods:

(a) Passing dry hydrogen chloride into an ether solution of the free base.

(b) Dissolving the free base in absolute methanol, adding one equivalent of methanolic hydrogen chloride, removing the solvent by evaporation under a stream of carbon dixoide, and washing the residue several times with dry ether.

(c) Dissolving the free base in absolute ether, adding a solution of methanolic hydrogen chloride dropwise until precipitation is complete, separating the precipitate by centrifugation and washing several times with dry ether.

The amorphous hydrochloride (M.P. 157–159° C. in an open capillary in an oil bath) is very soluble in methanol, ethanol, and acetone, soluble in water, and insoluble in ethyl ether and hexane. Its specific rotation is $[\alpha]_D^{23} = -54° \pm 3°$ (absolute methanol, c=0.6).

The following are additional characteristics of the crystalline free base:

Craig distribution: Dissolved in an ethyl ether—2% aqueous $NaH_2PO_4$ mixture (pH 4.5) and run through a 24 tube Craig distribution system, bioassays and the ultraviolet absorption maximum at 241 m$\mu$ show a peak at tube 6 with recoveries greater than 95%; and there is no indication of the presence of another component.

Ultraviolet absorption: Measured in 2% $NaH_2PO_4$, the ultraviolet absorption curve shows a maximum at 241 m$\mu$, $$E_{1\,cm}^{1\%} = 158$$

and measured in methanol or ethanol, a maximum at 327.5 m$\mu$, and 240 m$\mu$, $$E_{1\,cm}^{1\%} = 157$$

is observed.

Polarographic study:

| Conc. | Electrolyte | pH | id | E ½ vs. SCE |
|---|---|---|---|---|
| 0.1% | 0.1M LiCl—MeOH | | 5.5 (i max.) | −1.09 (E Max.) |
| 0.1% | 0.1M LiCl—MeOH + 0.01% Gelatin. | | 3.1 | −0.99 |
| 0.05% | 2% Aqueous $NaH_2PO_4$ | 4.6 | 2.0 | −1.07 |
| 0.05% | 2% Aqueous NaHPO + 0.02% Gelatin. | 4.6 | 1.6 | −0.85 |

Infrared absorption: The infrared absorption spectrum has been run as the Nujol mull of the crystals; and Figure 1 is a graph of the data thus obtained, tabulated below.

(NOTE.—Substantially the same infrared absorption spectrum is obtained using a chloroform solution of the antibiotic.)

| $\gamma(cm.^{-1})$ | $\gamma(cm.^{-1})$ | $\gamma(cm.^{-1})$ |
|---|---|---|
| 2,920 | 1,160 | 928 |
| 1,732 | 1,129 | 916 |
| 1,690 | 1,110 | 873 |
| 1,630 | 1,095 | 860 |
| 1,460 | 1,077 | 837 |
| 1,427 | 1,052 | 821 |
| 1,375 | 1,025 | 805 |
| 1,300 | 1,015 | 781 |
| 1,271 | 989 | 742 |
| 1,230 | 962 | 689 |
| 1,193 | 944 | |

The behavior of the antibiotic of this invention in crystalline base form when subjected to ascending paper chromatography at 26° C. using a culture of *Micrococcus pyogenes* var. *aureus* as the test organism is given below. The position of the antibiotic (Rf) is located in each case by a distinct zone of inhibition when placed on an agar medium seeded with the test organism.

DETERMINATION OF Rf

| System | Development Time (hours) | Rf |
|---|---|---|
| A. Benzene: water: acetic acid=1:9:0.5 | 4 | 0.80 |
| B. n-Butanol: water: acetic acid=4:5:1 | 16 | 0.90 |
| C. 0.2 N acetic acid | 4 | 0.80 |
| D. Water saturated with n-butanol | 4 | 0.95 |

Following are illustrative examples showing the process by which the antibiotic of this invention may be produced. These examples are merely illustrative and are not to be construed as limiting the invention.

*Example 1*

PREPARATION OF INOCULUM

*Stage I.*—Yeast beef or soybean infusion agar slants of *Streptomyces thermotolerans* are used to inoculate 500 ml. flasks, each containing 100 ml. of the following germination medium: Soybean meal, 1.5%; glucose, 2%; sodium chloride, 0.1%; calcium carbonate, 0.5%;

$CoCl_2.6H_2O$ 0.0005%; and tap water q.s. 100 ml. The medium is adjusted to pH 6.8–7.2 with 12 N NaOH before sterilization in an autoclave for 30 minutes at 121° C. The flasks are then inoculated and incubated at 25° C. for 72 hours on a reciprocating shaker having a 2-inch throw and making 120 strokes per minute.

*Stage II.*—Using the 72 hour-Stage I flasks, a 15 ml. sterile transfer is made to 2 one-liter side arm shaker flasks, each containing 300 ml. of the same germination medium as that used in Stage I. The flasks are then incubated at 25° C. for 48 hours on a reciprocating shaker under the same conditions as those described for Stage I.

FERMENTATION

To 10 liters of a fermentation medium consisting of: Soybean meal, 3.0%; cerelose, 2.2%; sodium chloride, 0.1%; calcium carbonate, 0.25%; cobalt chloride, 0.0005%; lard oil, 0.4; and tap water q.s., in an 18.9 liter stainless steel tank, which has been steam sterilized for 15 minutes at 121° C. is added the contents of one Stage II flask, obtained as described above. Fermentation is then allowed to proceed at 25° C. with mechanical agitation at 300 r.p.m., and aeration at a rate of 28.3 liters/min. (superficial velocity—61 centimeters/min.). A positive tank pressure is maintained at .35 kg./cm.² gauge, with lard oil or prime burning oil being added as needed as an anti-foam agent. After 84 hours' fermentation, the broth is adjusted to pH 2–3 with $H_2SO_4$ (conc.), then filtered using Hyflo (a filter aid). The filtered broth is extracted two times with ¼ volume ethyl ether at a pH 6.6. The ether is allowed to evaporate under vacuum in the presence of water to yield (1) a small amount of a water-insoluble oil and (2) a water-soluble fraction. When the water-insoluble oil is extracted with petroleum ether, a precipitate having a potency of 2500 d.u./mg., is formed. The water-soluble fraction, on freeze drying and recrystallization from hot (60° C.) isopropanol yields a pure product having a potency of about 7–10,000 d.u./mg.

ume of water at pH about 2.0–2.5 and the resulting aqueous solution is neutralized to yield the crystalline base, which is isolated by filtration. On drying, 144 g. base having a potency of 5000 d.u./mg. is obtained. Neutralization of the water extract of the amyl acetate and the water extract of the spent benzene yields approximately 20 g. crystalline antibiotic. Recrystallization of the antibiotic by dissolving the crystals in hot 70% aqueous isopropanol, then adding water until cloudiness occurs, yields 144 g. purified antibiotic having a potency of 7000 d.u./mg.

Following, in tabular form, is the fermentation data obtained in the course of the fermentations of Examples 1 and 2:

| Hours | 10 Liter Batch (1) | | 10 Liter Batch (2) | | Hours | 189 Liter Batch | |
|---|---|---|---|---|---|---|---|
| | pH | S. aureus Dil. units/ml. | pH | S. aureus Dil. units/ml. | | pH | S. aureus Dil. units/ml. |
| 0 | 7.4 | | 7.3 | | 0 | 7.2 | |
| 36 | 7.5 | 480 | 7.5 | 560 | 48 | 6.5 | 35 |
| 60 | 7.4 | 560 | 7.5 | 400 | 72 | 6.7 | 70 |
| 84 | 7.5 | 560 | 7.3 | 480 | 84 | 6.6 | 140 |
| Filtrate (of 84 hour broth) | 7.7 | 560 | 7.5 | 560 | | | 140 |

*Example 2*

PREPARATION OF INOCULUM

*Stage I.*—The procedure is the same as that employed in Example 1, Stage I.

*Stage II.*—A 72-hour-Stage I flask is used to inoculate an 18.9-liter serrated bottle containing 12 liters of the same germination medium (the medium having been steam-sterilized at 121° C. before inoculation) as that used in Stage I. The medium is adjusted to pH 6.8–7.2 with 12 N NaOH, then steam-sterilized for 1½ hours at 121° C. Incubation is then allowed to proceed at 25° C. Incubation is then allowed to proceed at 25° C. for 48 hours, with aeration at a rate of one liter per liter of medium per minute.

FERMENTATION

To 189 liters of fermentation medium consisting of: Soybean meal, 3.0%; cerelose, 2.2%; sodium chloride, 0.1%; calcium carbonate, 0.25%; cobalt chloride, 0.0005%; lard oil, 0.4%; and tap water q.s. in a 380 liter carbon steel tank, is added the contents of one Stage II bottle, obtained as described above. Fermentation is then allowed to proceed at 25° C. with mechanical agitation at 120 r.p.m. and aeration at a rate of 368 liters/minute (superficial velocity—31 cms./sec.). A positive tank pressure is maintained at .70 kg./cm.$^2$ gauge, with lard oil or prime burning oil being added as needed as an anti-foam agent. After 84 hours' fermentation, the broth is adjusted to pH 2–3 with $H_2SO_4$ (conc.), then filtered using a filter aid (Hyflo). The filtered broth is then treated as in Example 1 to obtain the concentrate and the crystalline antibiotic. (Alternatively, the crystalline antibiotic may be obtained from the filtered broth as follows: About 2630 liters of filtered broth are neutralized to pH about 7 and extracted with amyl acetate in a two-stage counter-current system (4:1 volume reduction). The resulting amyl acetate solution (681 liters) is extracted in a similar manner with water at pH 2.0–2.5 (4:1 volume reduction). The aqueous solution (170 liters) is then extracted by agitating with about 35 liters neutral benzene (pH about 7.0–7.5). After concentration to about 4.5 liters, the benzene extract is extracted with an equal volume of water at pH about 2.0–2.5 and the resulting aqueous solution is neutralized to yield the crystalline base, which is isolated by filtration. On drying, 144 g. base having a potency of 5000 d.u./mg. is obtained. Neutralization of the water extract of the amyl acetate and the water extract of the spent benzene yields approximately 20 g. crystalline antibiotic. Recrystallization of the antibiotic by dissolving the crystals in hot 70% aqueous isopropanol, then adding water until cloudiness occurs, yields 144 g. purified antibiotic having a potency of 7000 d.u./mg.

The antibiotic of this invention may be employed in the treatment of various infections in man and animals, inter alia, infections by the microorganisms listed hereinbefore in connection with its antibiotic spectrum. The antibiotic may be employed per se as embodied in any of the usual formulations or dosage forms, for administration orally, parenterally, or topically. Also, the antibiotic may be administered concurrently with (or mixed with, in a suitable formulation) various other antibiotics (e.g. neomycin) or chemotherapeutic agents (e.g. N-hydroxy-2-pyridinethione).

This invention may be variously otherwise embodied within the scope of the appended claims.

We claim:

1. A process for producing an antibiotic, which comprises cultivating *Streptomyces thermotolerans* under aerobic conditions in an aqueous nutrient medium containing assimilable sources of carbon and nitrogen until a substantial amount of antibiotic is produced, then recovering the antibiotic from the fermentation broth.

2. The process of claim 1 wherein submerged aerated conditions are maintained.

3. The process of claim 2 wherein the temperature is maintained at about 20° to 40° C.

4. The process of claim 2 wherein the temperature is maintained at about 25° C.

5. The process of claim 1, wherein the nutrient medium is maintained at pH about 5 to 9.

6. The process of claim 1, wherein the nutrient medium is maintained at pH about 7.

References Cited in the file of this patent

UNITED STATES PATENTS

| 2,771,392 | Tanner et al. | Nov. 20, 1956 |
| 2,796,379 | Tanner et al. | June 18, 1957 |

OTHER REFERENCES

Hochstein et al.: J.A.C.S, 76, October 20, 1954, pp. 5080–5083.

Waksman: Bacteriological Reviews, vol. 21, No. 1, March 1957, pp. 1 to 30; pp. 19 and 22 relied on.

Pridham et al.: Applied Microbiology, vol. 6, No. 1, January 1958, pp. 52 to 79.